US012770492B1

(12) United States Patent
Ayala et al.

(10) Patent No.: US 12,770,492 B1
(45) Date of Patent: Oct. 20, 2026

(54) INDIRECT EMISSIONS MONITORING SYSTEM AND METHOD

(71) Applicant: United Services Automobile Association (USAA), San Antonio, TX (US)

(72) Inventors: Jennifer Dawn Ayala, Mico, TX (US); Bradly Jay Billman, Celina, TX (US); Jennifer Marie Chandler-Bradley, Wesley Chapel, FL (US); Emily Nicole Van Santen, Denver, CO (US); Keegan Patrick Hayes, Whitestown, IN (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/898,181

(22) Filed: Sep. 26, 2024

Related U.S. Application Data

(60) Provisional application No. 63/586,828, filed on Sep. 29, 2023.

(51) Int. Cl.
*G08B 21/14* (2006.01)
*G08B 1/08* (2006.01)

(52) U.S. Cl.
CPC ............... *G08B 21/14* (2013.01); *G08B 1/08* (2013.01)

(58) Field of Classification Search
CPC ................................ G08B 21/14; E05F 15/70
USPC ........................................................ 340/632
See application file for complete search history.

(56) References Cited

U.S. PATENT DOCUMENTS

2008/0092631 A1* 4/2008 Griswold ............. G01N 33/004 73/31.05
2015/0022351 A1* 1/2015 Gettings .................. G01D 7/00 340/540
2017/0300818 A1* 10/2017 Sinitsyn ................... G06N 3/08

FOREIGN PATENT DOCUMENTS

CN 110107937 A * 8/2019 .......... F24C 15/2021
TR 200601120 U * 8/2006

* cited by examiner

*Primary Examiner* — Davetta W Goins
(74) *Attorney, Agent, or Firm* — Fletcher Yoder, P.C.

(57) ABSTRACT

A system or method for receiving audio data from an area via one or more audio sensors and correlating the received audio data to known audio data, wherein correlation of the received audio data to certain known audio data indicates a likely carbon monoxide emission process. In response to identifying audio data that is likely generated by a carbon monoxide emission process, performing a mitigating action, such as activating an alarm or opening a vent.

20 Claims, 3 Drawing Sheets

INDIRECT EMISSIONS MONITORING SYSTEM AND METHOD

CROSS-REFERENCE TO RELATED APPLICATION

The present application claims priority to and the benefit of U.S. Provisional Application No. 63/586,828, entitled "INDIRECT EMISSIONS MONITORING SYSTEM AND METHOD" and filed on Sep. 29, 2023, the disclosure of which is incorporated by reference herein in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admission of prior art.

Carbon monoxide (hereinafter "CO") producing devices (e.g., motor vehicles, power tools, lawn equipment) are frequently utilized in residential, commercial, and industrial environments. Accumulation of CO in a particular area can pose a health risk to individuals present in the area because CO is a poisonous, odorless, and colorless gas. Such accumulation of CO has become a recognized problem. For example, with the advent of vehicles capable of remote and keyless starting, it seems easier than ever to mistakenly start or leave a vehicle running in a low ventilation area, such as a garage.

Traditional technology for detecting CO in an environment requires accumulation of a certain amount of CO in the area to enable detection. However, it may be desirable to prevent even a limited amount of CO in spaces of concern. Accordingly, it is now recognized that it is desirable to provide systems and methods for detecting and/or mitigating potential CO accumulation in certain areas before substantial amounts of CO can accumulate.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with an embodiment of the present disclosure, a carbon monoxide (CO) monitoring system may include an audio sensor configured to be disposed in a structure that is configured to house at least one CO producing device, where the audio sensor is configured to detect sound and provide audio data based on the sound. The CO monitoring system may also include a computing system that is configured to receive the audio data provided by the audio sensor, determine whether the audio data is indicative of a CO emission event based on the audio data and audio templates of an audio database, and identify and execute one or more actions in response to determining the audio data is indicative of the CO emission event.

In accordance with another embodiment of the present disclosure, a non-transitory computer-readable medium comprising computer-executable instructions that, when executed by a processor, may cause the processor to receive audio data associated with a low ventilation area from an audio sensor, determine whether the audio data is indicative of a CO emission event within the low ventilation area based on the audio data and audio templates of an audio database, and execute one or more actions in response to determining the audio data is indicative of the CO emission event.

In accordance with a further embodiment of the present disclosure, a method may include receiving audio data associated with a low ventilation area from an audio sensor. The method may also include determining whether the audio data is indicative of a CO emission event based on the audio templates of an audio database. The method may further include executing one or more actions in response to determining the audio data is indicative of the CO emission event, where the one or more actions may include initiating a CO detection sensor.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
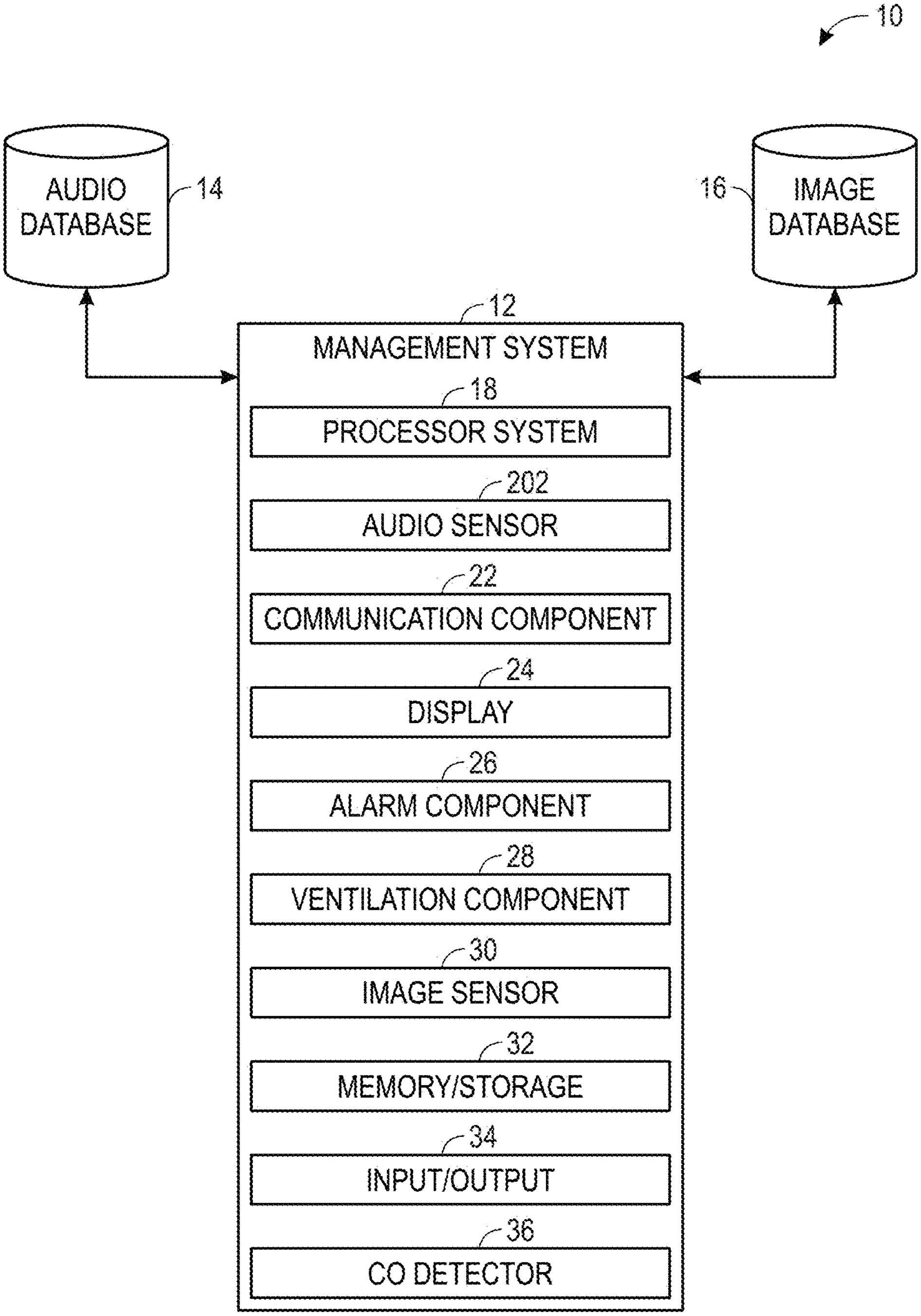
FIG. 1 is a block diagram of a CO monitoring system for carbon monoxide assessment, wherein the CO monitoring system includes an audio sensor and is communicatively coupled to a number of data sources, in accordance with present embodiments.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "automatic" and "automatically" refer to actions that are performed by a computing device or computing system (e.g., of one or more computing devices) without human intervention. For example, automatically performed functions may be performed by computing devices or systems based solely on data stored on and/or received by the computing devices or systems despite the fact that no human users have prompted the computing devices or systems to perform such functions. As but one non-limiting example, the computing devices or systems may make decisions and/or initiate other functions based solely on the decisions made by the computing devices or systems, regardless of any other inputs relating to the decisions.

As used herein, the term "computing system," "processor system" or "control system" refers to an electronic computing device such as, but not limited to, a single computer, virtual machine, virtual container, host, server, laptop, wearable and/or mobile device, or to a plurality of electronic computing devices working together to perform the function described as being performed on or by the computing or control system. As used herein, the term "medium" refers to one or more non-transitory, computer-readable physical media that together store the contents described as being stored thereon. Embodiments may include non-volatile secondary storage, read-only memory (ROM), and/or random-access memory (RAM). The methods described herein may be encoded as executable instructions embodied in a computer readable medium, including, without limitation, a storage device and/or a memory device. Such instructions, when executed by a processing device, cause the processing device to perform at least a portion of the methods described herein. It should be noted that non-transitory merely indicates that the media is tangible and not a signal. The above examples are exemplary only, and thus are not intended to limit in any way the definition and/or meaning of the term processor, processing system, processing device, or the like.

This disclosure relates to improving safety and awareness around carbon monoxide (CO) production that may create undesirable conditions in enclosed spaces. CO is a poisonous, odorless and colorless gas that can go undetected without proper precaution. Accumulation of CO within unventilated spaces in residential, commercial and industrial environments has become recognized as a problem. For example, with the advent of vehicles capable of remote and keyless starting, it may be easier than ever to mistakenly start or leave a vehicle running in a low ventilation area, such as a garage or other structure. A low ventilation area may be exposed to outdoors (e.g., a structure with openings, a structure that is open to its surroundings) but may still have the potential to accumulate gas.

CO detectors have been developed to alert individuals of the presence of CO within a space. For example, in homes, some traditional CO detection techniques use electrochemical sensors composed of electrodes in an electrolyte solution to detect the presence of CO or they may use a photosensor to determine a change in color of a gel that occurs when the gel is exposed to CO. These CO detectors are typically used throughout the home; however, they are not typically used within a garage. Often traditional CO detectors are not designed or approved to operate in conditions typical in a garage (or other areas where CO-emitting vehicles and equipment are often employed). Large variations of CO levels, temperature, and humidity present within typical garages can rapidly destroy the sensing mechanisms within these traditional CO detectors. Due to resulting shortened life and lessened effectiveness, traditional CO detectors have faced challenges being utilized within garages (and areas with similar environments) due to the associated typical environmental conditions.

In accordance with present embodiments, by utilizing audio signature detection of likely CO emission events, the need for chemical reactions to detect CO may be lessened or even eliminated. Indeed, audio data may be employed instead of, as a supplement to, and/or preliminarily to more traditional (e.g., more direct) CO detection, in accordance with present embodiments. Thus, audio sensing, as utilized in the present disclosure in conjunction with or separately from traditional CO detection, allows for more robust CO assessment that limits traditional concerns regarding the impact of fluctuations in CO levels, temperature, and humidity on CO sensing/assessing operations. Indeed, present embodiments allow for the use of audio signature detection in numerous environments (e.g., typical garages) that may be difficult for other detectors (e.g., chemical-based CO detectors).

The nature of traditional CO detection requires that an area must first essentially fill with CO to a certain part per million threshold before detection can occur. However, it is now recognized that, in cases of CO accumulation, it is important to give individuals warnings so they may get out of an impacted area. Many CO-producing vehicles produce the most amount of CO upon startup. In the case of combustion-based vehicles, the cold start which occurs within a garage is when the fuel mixture is at its richest, the engine is coldest and the catalytic converter is the least effective. This causes the first few minutes of a vehicle operating to be when much more CO is produced. Spaces with low airflow, like a garage, may not vent quickly and may cause the CO produced by a vehicle to stay in the garage for hours at a time. In accordance with present embodiments, the use of an audio-based detection system may allow for the detection of a source of CO almost immediately and before a related space fills with CO. With an early warning system in accordance with present embodiments, individuals may have more time to react to the space filling with CO than with traditional CO detectors.

With the foregoing in mind, in certain embodiments, a CO monitoring system (which may be or include a computing system) may receive audio data via a sound recording sensor which may continuously monitor a space for sound data of interest. Sound data of interest may be identified by filtering out some sounds and focusing on other sounds (e.g., based on sound characteristics and known sound structures). By performing such a filtering operation, processing may be made more efficient, which may save time and expense (e.g., reduce the need for computer hardware).

Audio data of interest, once identified, may also be recorded within an audio database to increase the amount of data the CO monitoring system may utilize for its subsequent determinations related to audio of interest. Indeed, audio data may be correlated with information obtained from more direct CO detection sensors (e.g., traditional chemical-based sensors) to identify sounds that correspond to CO emission. Artificial intelligence (hereinafter "AI") and machine learning (hereinafter "ML") may be trained with such data. The CO monitoring system may use the data from the audio database and detected audio data (e.g., detected by an audio sensor) to identify audio signatures. These audio signatures may be labeled and directly associated with their source and/or with CO detection. Once the computer system identifies enough audio signatures it may utilize them separately or in combination to understand what is occurring within a monitored space. This will allow for the identification and/or ranking of different issues that may merit being addressed. Once identified, issues may be addressed according to their assessed level of priority. The computer system may label the priority level of each sound (or associated assessed event) in order to determine what further action is appropriate. For example, if the computer system identifies a vehicle running in a garage and associates that with high CO emission (e.g., a vehicle with a combustion engine), then the computer system may trigger the garage door to open, alert the owner, cause an alarm to be sounded and/or turn on a ventilation system. It should be noted that an assessed event, in accordance with the present disclosure, may refer to a CO emission event (e.g., starting of a car) as determined to likely be occurring by the CO monitoring system (e.g., a computing system) based on audio data alone or in combination with other data.

In an embodiment when detected audio data contains the sound of a vehicle running, the CO monitoring system may query an audio database based on the audio data to determine vehicle data associated with characteristics of the audio data (as detected by an audio sensor). The system may also look up associated individual data (e.g., data from a contact list) and/or other system data (e.g., data related to a garage door). The vehicle data may include information regarding the vehicle make, model and/or estimated CO production. The individual data may indicate the sound profile of a person inside the vehicle or the sound of an individual nearby. The garage door data may indicate the sound profile of the garage space with the garage door open or closed. Any sounds occurring within the garage may sound differently when the garage door is closed than they do when the garage door is open. By detecting and analyzing sound characteristics of this nature, present embodiments may better correlate the audio signatures of each event and what actions to take.

After identifying the type of audio data present within the space, the CO monitoring system may make a determination of an appropriate action to take based upon an associated situation and/or a priority level assessed. For example, the audio data may be analyzed and correlated to various event types. In the case of detecting audio found to be indicative of a vehicle filling up a space with CO, the system may choose to open an external door to the space to allow for some natural ventilation of the space and simultaneously create an opportunity to escape the space for anyone trapped inside (e.g. open an automatic garage door opening). Additionally or alternatively, the system may activate a ventilation system associated with the space. This ventilation system would function to replace the air within the space with outside air to help remove some of the CO within the space. This may prevent individuals within the space from breathing in too much CO. A confirmation system may also be initiated wherein correlation of the audio data to a CO emission event triggers a traditional CO detector, a video monitor, or the like to confirm or reject the audio-based assessment. The traditional detector may be protected from degradation by sealing it away until an audio event triggers it for use. Thus, the audio system may prevent overuse of a traditional sensor. Further, audio assessment of potential CO emission events may provide extra time (prior to heavy accumulation of CO) for remediation relative to traditional methods that required a certain leave of CO to be present before detection occurs.

After identifying the sound as correlated to a CO emission event (e.g., a combustion engine starting), the CO monitoring system may create a warning or notification of varying types. In a simple case, the system may have a built-in alarm to create a notification sound in the event a significant issue is identified. The CO monitoring system may also utilize (e.g., communicatively couple with) a preexisting alarm system in order to generate an alarm for everyone in the surrounding area. For example, the CO monitoring system may use the alarm system to contact preprogrammed emergency contacts (e.g., via phone) in the case of an ongoing problem or simply utilize speakers or other audio emitters of an existing alarm system. The CO monitoring system may also utilize a database to contact (e.g., through an automatically generated phone call, an application alert and or an email notification) designated contacts (e.g., an owner of the monitored space, emergency services). For example, if the system has detected there is a vehicle running within a homeowner's garage, it may quickly act to contact the owner (e.g., via a text message). During, before or after the system attempts to mitigate the situation (e.g., reduce its priority level by limiting CO accumulation), the system may act to inform the proper contacts of the situation. It may do this by providing an automated message indicating the situation and what actions or precautions are appropriate. Additional details regarding systems and methods for responding to identified audio data (e.g., including one or more actions concerning verification, alerting, and mitigating the priority level associated with the audio data identified) will be described below with reference to FIGS. 1-4.

Turning now to the figures, FIG. 1 is a block diagram of a CO monitoring system 10 that includes a management system (also referred to as a computing system) 12, an audio database 14, and an image database 16. Although the management system 12 is depicted as being associated with just two databases in FIG. 1, it should be noted that the management system 12 may be associated with any number of data sources (e.g., one or more) in order to assist it in performing the tasks described herein. This management system 12 may include any suitable computer device such as a server system computer, a desktop computer, an industrial controller (e.g., a programmable logic controller), a laptop computer, a tablet, a smart device (e.g., a smart phone), or other types of computers that are configured in accordance with the present embodiments. The management system 12 may also include a variety of components in order to assist the computing system 12 in performing the operations laid out in the present embodiments. These components may include but are not limited to a processor system 18 (e.g., one or more processors that work together or separately to perform operational tasks), an audio sensor 20, a communication component 22, a display 24, an alarm component 26, a ventilation component 28, and an image sensor 30. In addition, the management system 12 may include an amount of memory and/or storage 32, input/output ports 34 (e.g., for internet communications, database communications, user inputs, instructions), and a traditional CO detector 36 (e.g., a chemical-based CO detector).

In general, it should be understood that the management system 12 may include one or more computing devices (e.g., incorporating all or part of the processor system 18 and the memory/storage 32) of any suitable type. The computing device(s) may include, but are not limited to: a personal computer, a smartphone, a tablet computer, a wearable computer, an automotive computer, a desktop computer, a laptop computer, a notebook computer, a network computer, a server computer, a mainframe computer, a distributed computing device (e.g., a cloud computing device), a micro-computer, a system on chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects. Further, the management system 12 may integrally include or include via communicative coupling various other features, such as those illustrated as part of the management system 12 in FIG. 1 (e.g., the audio sensor 20, the display 24, the ventilation component 28, and so forth).

The processor system 18 may include one or more of any type of computer processor or microprocessor capable of executing computer-executable code, including an assortment of such processors. The processor system 18 may also represent or include multiple processors that may separately perform or cooperate to perform the operations described herein in accordance with present embodiments.

The audio sensor 20, which may represent one or more sensors, may be a sensor capable of acquiring audio data from an area surrounding the audio sensor 20. As such the audio sensor 20 may be a microphone or other suitable audio recording device capable of picking up on and recording audio data. The audio sensor 20 may utilize noise cancelling technology in order to isolate sounds of higher priority in a specific area. This technology could be utilized to filter out low priority sounds and make the relevant audio data clearer for processing (e.g., via the processor system 18) based on a computer program or algorithm in accordance with present embodiments. Filters and noise canceling technology may be employed to achieve this result. The audio sensor 20 may also use a structural design which allows the device to block out sounds that are exterior to a monitored space (e.g., a garage interior) such as lawnmowers outside or a plane flying overhead.

The communication component 22 may be a wired or wireless communication component that facilitates communication between the computing system 12, databases (e.g., databases 14 and 16) and various other computing systems via a local network, the Internet, data cables, or the like. The communication component 22 may include wired or wireless technology that allows for communication between the illustrated features of the CO monitoring system 10, such as the processor system 18, the audio sensor 20, the display 24, the alarm component 26, the ventilation component 28, and so on.

The display 24 may depict warnings, system update information, and visualizations of issues identified by the CO monitoring system 10. For example, the display 24 may be a central display or a display of a user device (e.g., a smart phone display) and it may be used to show representative graphics of an assessed event (e.g., a graphic of a car emitting gas) or images captured from a monitored location when an assessed event is identified. It may also display other types of visualizations associated with software or executable code being processed by the processor system 18. The display 24 may be any suitable type of display, such as but not limited to a touch screen, a liquid crystal display (LCD), plasma display, or an organic light emitting diode (OLED) display. The display 24 may function as part of the control interface with the management system 12 in an embodiment in which the display 24 includes a touch screen mechanism.

The alarm component 26 may be a speaker or siren capable of producing an audio alarm to the area surrounding a device of the computing system 12. As such the alarm component 26 may be a speaker or other suitable sound-producing device capable of alerting those contacted or within range of the situation identified. The alarm component 26 may also have visual aspects (e.g., lights or displays). It should be noted that, while illustrated separately, any number of the illustrated features may be integrated with each other. For example, the alarm component 26 (e.g., a speaker) may be integrated with the audio sensor 20 (e.g., a microphone).

The ventilation component 28 may be a fan system associated with the computing system 12 which may be used to direct gases (e.g., air) out of a relevant location (e.g., a garage). The ventilation component 28 may represent any number of components capable of directing gases away from the area such as fans or natural draft inducers with some form of mechanized functionality. The ventilation component 28 may be as basic as a garage door opener that may open the garage when activated, or it could be a complex system for utilizing or providing instructions for use of an oxygen supply, a gas mask, or the like to allow individuals located within the garage to breathe sufficient air.

The image sensor 30 may be a sensor capable of receiving image data from the surroundings of the computing system. The image sensor 30 may be a camera or other suitable image-capturing or video-capturing device. For example, the image sensor 30 may be an infrared light sensor or even a laser beam detector (e.g., such that a physical object breaking the beam is indicative of the presence of the physical object).

The memory and the storage 32 may be any suitable articles of manufacture that can serve as media to store processor-executable code, data or the like. These articles of manufacture may represent computer-readable media that may store the processor-executable code used by the processor 18 to perform the presently disclosed techniques. As used herein, applications may include any suitable computer software or program that may be installed onto the computing system 12 and executed by the processor 18. It should be noted that non-transitory merely indicates that the media is tangible and not a signal. The I/O ports may be interfaces that may couple to other peripheral components such as input devices, sensors, I/O modules, and the like.

The management system 12 may use auditory ML or other AI to determine whether the detected audio data is indicative of an CO emission event and/or to discern the source of unique sounds identified via the audio sensor 20 within a monitored space. ML is a tool in which computer systems (e.g., the management system) learn and adapt to analyze large amounts of data to draw conclusions and reach a goal. Here, the goal may be to identify audio data produced by CO-emitting devices (e.g., vehicles). The management system 12 may analyze the audio signature of each source of sound within a space and isolate the particular sounds deemed to be relevant. This may be done by filtering out sounds of known origin that do not correlate to CO emission. It may also involve filtering out sounds of known CO-emitters.

As an example, once the management system 12 has isolated the sound of a suspected vehicle or other CO emitter, it may compare the corresponding audio signature to audio templates contained within the audio database 14. If a match is identified, the management system 12 may take appropriate action. The appropriate action may include filtering out the sound (e.g., because it is known to be of no concern), assessing whether the sound correlates to CO emission by checking/activating direct CO monitors, performing a mitigation operation (e.g., opening a vent due to a known association of the audio data with a CO emitter), or some other action. Where an ML is being used within the management system 12, it will become easier for it to identify various sounds with more experience and more audio signature data. The more data it acquires the better corresponding matching capabilities may become. Further, in coordination with direct CO sensing, a larger database of associations between sounds and CO emission may be established. For example, a new sound (e.g., the sound of a gas-powered scooter) may be identified and CO measurements may indicate that the sound of the gas-powered scooter correlates to a certain level of CO emission. This can later be used by the management system 12 to determine what actions to take simply based on detection and identification of the sound of the gas-powered scooter.

The management system 12 may use predictive algorithms in order to improve performance of detection. For example, the predictive algorithm may operate to identify when people are most likely to leave their vehicle running in a garage, such as in the event of cold weather, which may be detected by weather data (e.g., from a website), temperature sensor, pressure sensors, and the like. Overtime this predictive algorithm could be refined utilizing artificial intelligence in order to be able to determine the most likely times and places in which events occur. During these times the device could enter a heightened level of monitoring in order to engage further monitoring abilities. Such as turning a camera on to visually monitor an area that is usually only auditorily monitored. This heightened level of monitoring could also be used to educate the end user by sending to the user an analysis of times and places when they are most likely to have an accident, leave something on, or anything else. This data collected by the predictive algorithm would allow the end user to be educated in the matter, and allow them to pay special attention during those times and places.

In some embodiments, the management system 12 may be communicatively coupled (e.g., via the communication component) to the audio database 14 and the image database 16. The audio database 14 may include a collection of audio signatures (also referred to as audio templates) corresponding to various vehicles, power tools, and other sound-producing devices or activities. For example, an audio signature may include characteristics of a previously recognized audio event (e.g., audio frequency and amplitude information corresponding to operation of vehicle), which may be employed to determine operating mode and positioning of a sound source within an area of interest (e.g., the garage). The audio database may include previously identified audio signatures of lawn mowers, power tools, and any other sound emitters that may generate sounds within a detectable range of the audio sensor 20. The audio database may also include voice identification data to allow for voice activation and voice recognition. This may facilitate voice-based control of the management system 12 and/or detection of a human located in the monitored space.

The image database 16 may include silhouette data regarding vehicles, shapes associated with vehicles, raw images of vehicles, images of other types of noise producing objects, people and the like. This data could be utilized in techniques involving visual verification of situations identified based on audio data or in coordination with audio data to identify the situations. For example, image data could be utilized to identify that a person is present in an operating vehicle within a monitored location (e.g., a garage), and whether the person is in an incapacitated state or otherwise in a difficult situation.

The audio database 14 and/or the image database 16 (or a separate database) may also include data regarding various vehicles such as engine type, make, model, gas mileage, CO emission level, performance data, and so forth. This data may be linked to audio and/or visual characteristics, which allows the management system 12 to compare and link the data. For example, detected audio data may be found to substantially match a stored audio signature and the audio signature may be associated with a particular type of automobile. In this example, an assessment of a situation associated with detection of the audio data may be informed by the nature of the automobile and its operational characteristics (e.g., a tendency to emit a large amount of CO at startup). Similarly, image data may likewise be used to link to more informative data. For example, once audio data has indicated a likely CO emission event, image data may be employed to better identify the source of the CO emission and link to operational information that may suggest a level of CO emission.

As an example, the management system 12 may acquire audio and/or image data of a vehicle located within a garage through the audio sensor 20 and/or image sensor 30. Based on a correlation between the audio and/or image data and established template data (e.g., a previously acquired audio signature, a vehicle profile, or the like), the management system 12 may determine that a substantial CO emission event is underway. Due to predicted CO emission levels, the event may be designated as having a priority level that merits mitigation. For example, due to the determined priority level, the computing system 12 may operate the display 24 to present a notification (e.g., activate an alarm) and/or a graphical user interface (GUI) to prompt a user. In an embodiment, the GUI could enable a user to turn off an alarm, present information regarding potential actions, present visual instructions on how to respond or prevent the event in the future, or give a report of activity that may have occurred while the user was away from the area (e.g., the garage).

The management system 12 may utilize audio data from the audio sensor 20 to cross-reference with information from the audio database 14 in order to identify the priority level of the situation in the monitored space. After identifying the priority level, the computing system 12 may utilize the image data to verify the identified situation by utilizing visual ML or AI to verify the situation. The audio-based identification of the situation may prompt the management system 12 to monitor image data for specific image signatures (e.g., a vibrating car shape). After verifying the priority level, the device may utilize the communication component 22 to send out alerts (e.g., audio alerts, visual alerts, direct messages to contacts). The communication component 22 may also be utilized to communicate with external devices such as those illustrated in FIG. 2 (e.g., an external alarm system 52, a garage door system 48, a ventilation system 50, a vehicle 42 or any other similar systems). The communication component 22 may interface with a car nearby (e.g., inside or outside of the garage) and through this interface it could activate the car's alarm system. For example, in a case where the management system 12 recognizes that there has been a car left on in a closed garage, the car's alarm system could be activated to notify those nearby to stay clear or to assist in some way. The communication component 22 could also interface with the vehicle to turn it off or perform some other operation to mitigate the situation. As another example, the computing system 12 may communicate with a vehicle (e.g., via the communication component 22) to alter an air conditioning system setting of the vehicle to turn on recirculation of the air within the vehicle to attempt to prevent the vehicle from quickly filling up with CO.

The alarm component 26 and/or the ventilation component 28 may also be activated in the event that the identified priority level is high enough. This would allow the system to alert individuals within range of hearing or seeing the alarm component 26 while also limiting accumulation of CO. Indeed, the ventilation component 28 could be activated in the event of an identified situation to avoid CO accumulation in the space. Because the system predicts CO accumulation and does not rely on detection of said accumulation, activation of the ventilation component 28 may prevent the monitored space from filling with CO to the extend it would prior to detection by traditional CO detection systems.

Figure 2:
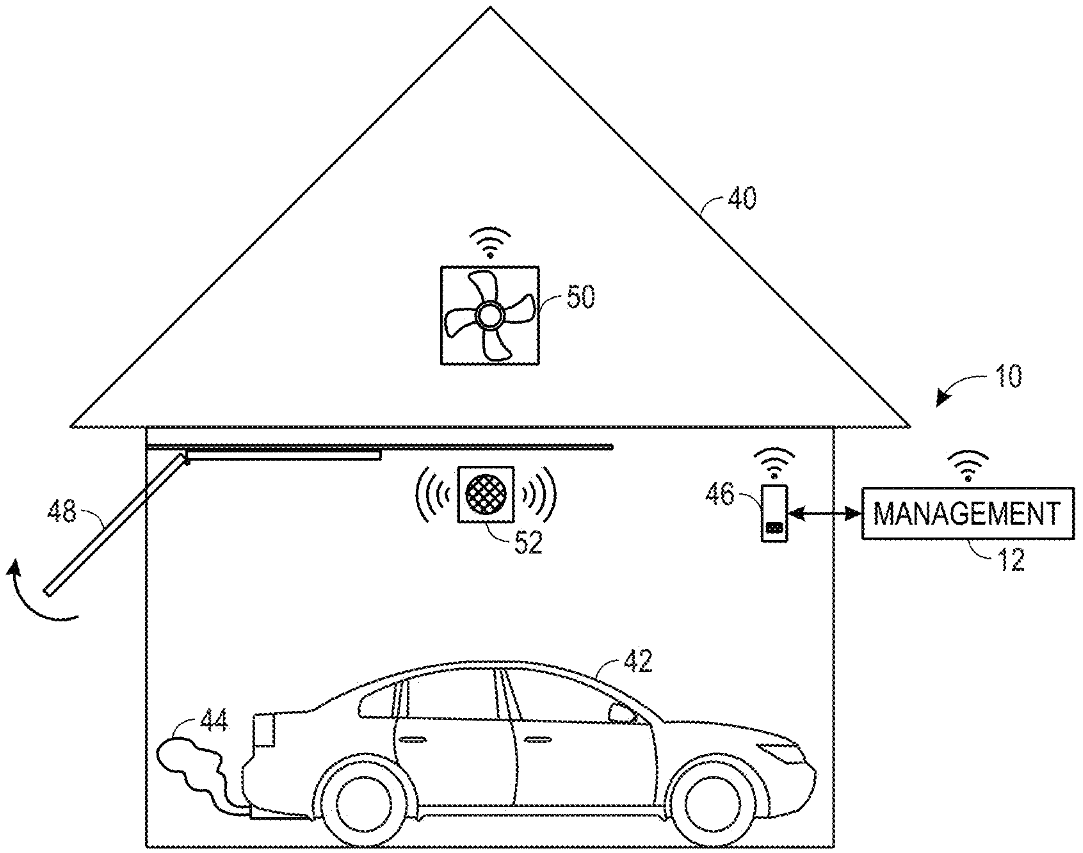
FIG. 2 is a schematic depiction of a garage with a vehicle operating in a manner that results in CO emission, wherein the CO monitoring system is operating to mitigate accumulation of CO based on determining a likelihood of said accumulation, in accordance with present embodiments.

With the foregoing in mind, FIG. 2 is a schematic representation of an example embodiment in which the CO monitoring system 10 is employed for monitoring a garage 40. Specifically, FIG. 2 represents a captured instant in time where the garage 40 contains a running vehicle 42, gas emissions 44 from the vehicle 42, a detection system 46 (e.g., sensing and communication components of the management system 12), a garage door system 48, a ventilation system 50, and an external alarm system 52. In this embodiment the detection system 46 may be utilized to identify the vehicle 42 running within the garage 40 based on audio emitted from the vehicle 42 while running. The detection system 46 may utilize audio data obtained via an audio sensor (e.g., audio sensor 20) to identify that the vehicle is running within the space and that could result in filling the garage 40 with the gas emissions 44 (e.g., gas including carbon monoxide). Based on this assessment, the management system 12 may process the data to identify an appropriate response, which may be communicated to other aspects of the CO monitoring system 10 or to separate devices, such as the garage door system 48. Such communications may be performed wirelessly or via direct electrical connections. Actions that the management system 12 may initiate in response to detecting a CO-emitting event (e.g., the vehicle 42 running) may include activating the external alarm system 52, opening the garage door system 48, and/or activating the ventilation system 50. Depending on the identified priority level of the CO-emitting event the management system 12 may determine different mitigating actions or sets of actions to implement. As another example, the management system 12 may activate a traditional CO detection feature of the detection system 46 to confirm the audio-based detection with a more traditional chemical-based test.

While FIG. 2 depicts the CO monitoring system 10 as various different components located inside and outside of the monitored space (i.e., the garage 40), it should be noted that the CO monitoring system 10 may be a standalone system excluding some of the illustrated components or including the illustrated components integrated into a single device. Further, while FIG. 2 depicts a specific example scenario, the CO monitoring system 10 may be employed in numerous different scenarios to identify likely CO emission situations. For example, the detection system 46 may be placed beside a swimming pool where it could detect if there are unusual voices or activities occurring. Activities such as a child or a pet falling into the pool and the sound associated with that. The CO monitoring system 10 may also be used to detect certain types of wildlife out in the forest or desert and the sounds which they make. This may be utilized to alert wildlife preserves of activities of animals within different areas. The CO monitoring system may be utilized in a diverse number of settings with a diverse number of purposes. However, it is referred to as a CO monitoring system because it can be used to identify CO-emission events indirectly based on audio (and other indications).

Figure 3:
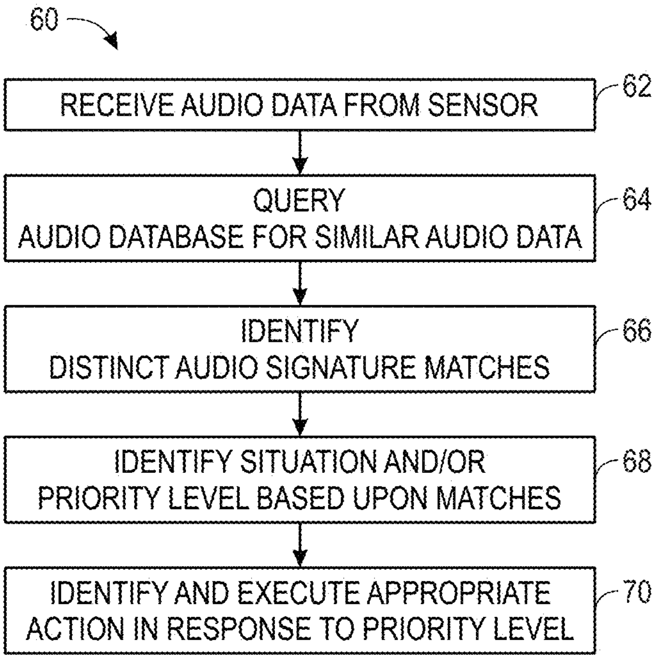
FIG. 3 is a flow chart of a method of CO monitoring system operation, in which the CO monitoring system responds to a detected event within a monitored space, in accordance with present embodiments.

FIG. 3 is a flow chart of a method 60 for assessing audio data to identify potential conditions and executing mitigating responses based on identified conditions, in accordance with embodiments described herein. For example, the method 60 of FIG. 3 may be employed to determine that a CO-emitting event has likely occurred based on audio data, determine that the event has elevated priority, and initiate a mitigating action (e.g., opening a vent to avoid CO accumulation) based on the elevated priority. While various system components may be involved in performing the method 60, for ease of reference, the method 60 is generally discussed as being implemented by the processor system 18, as will be understood by one of ordinary skill in the art.

Specifically, in FIG. 3, at block 62, the processor system 18 may receive audio data from the audio sensor 20. The audio data may be received in real-time and directly from the audio sensor 20 or the audio data may be received in a batch of data that has been accumulated (e.g., in memory 32) over a time period. The method 60 may be performed by the CO monitoring system 10, components thereof, and/or components in communication therewith. In particular, the processor system 18 may perform certain analytics, assessments, determinations and the like based on programming that may be stored in the memory/storage 32.

At block 64, the processor system 18 may compare the audio data received from the audio sensor 20 with template audio data stored in the audio database 14 to identify correlations between the audio data and the template audio data. For example, the template audio data may include audio data stored in the audio database 14 and that is known to correspond to a particular type of vehicle with its engine running while parked within an enclosed space. Thus, block 64 can be considered to represent the processor system 18 employing audio recognition technology to infer or determine a type of device or system producing the audio data received by the processor through the audio sensor 20.

The audio recognition technology may be capable of detecting audio characteristics and utilizing a database or machine learning to correlate detected audio to audio generated by specific event types (e.g., a truck starting in an open garage). This is represented by block 66, which may include identifying audio signature matches. For example, substantially overlapping audio characteristics between detected audio data and template audio data may be considered a match. The term "match" does not require identical features but a sufficient correspondence between audio aspects to determine relatedness. Determinations may include identifying detected audio data (e.g., audio detected or otherwise determined to originate in a monitored area) that corresponds to template audio data (e.g., previously identified audio that has been linked to other data, such as a source type) associated with an open or closed environment. Distinctions between audio in a closed environment (e.g., a closed garage) and audio in an open environment (e.g., an open garage) may be made based on frequencies, reverberations, echo, and other audio characteristics. In certain embodiments, the processor system 18 may query or search the audio database 14 for template audio data that matches (e.g., heavily correlates to) a signature of detected audio data and then use known source data for the template audio data to assess a likely source and/or condition (e.g., high CO emission) for the detected audio data.

Once an audio signature match is established (e.g., detected audio data is determined to correlate to a particular event type), the processor system 18 may designate a situational assessment and/or assign a priority level to the assessment, as illustrated by block 68. The priority level may be considered a designation of a nature of the assessed event type that can be used to control a mitigating response. For example, when a determination has been made that a detected sound likely corresponds to a gasoline-powered vehicle running in a garage, the priority level may be set to a relatively high level because CO is likely to accumulate relatively quickly based on the assessed situation.

At block 70 of method 60, the processor system 18 may identify and execute an appropriate action or actions in response to the situation or level of priority previously identified. In the example of a car running in a garage, some steps could be for the processor system 18 to initiate sounding of an alarm, open the garage, activate the ventilation system, or contact one or more cellphone. Different actions may occur at different times depending on the priority level of the event and the duration over which the event is occurring. For example, the processor system 18 could first notify a cellphone designated as belonging to the garage owner. Specifically, the notification could indicate that a medium priority power tool was left running in the garage. If the processor system 18 identifies that there are individuals nearby the garage (e.g., via camera(s), Wi-Fi, near-field communications) it could then sound an alarm to gain their attention (e.g., via a personal device wirelessly connected to the processor system 18, a speaker, a siren, or the like). Further, the display 24 or a display on a connected user device (e.g., a smart phone) may be controlled to present a visualization of the identified event occurring (e.g. the car running, the power tool operating, or lawn mower running) in order to communicate the nature of the event to the user. Then the processor system 18 may at any time use the image sensor to assist in verifying or better identifying the event the audio data indicates is likely occurring within the garage.

Figure 4:
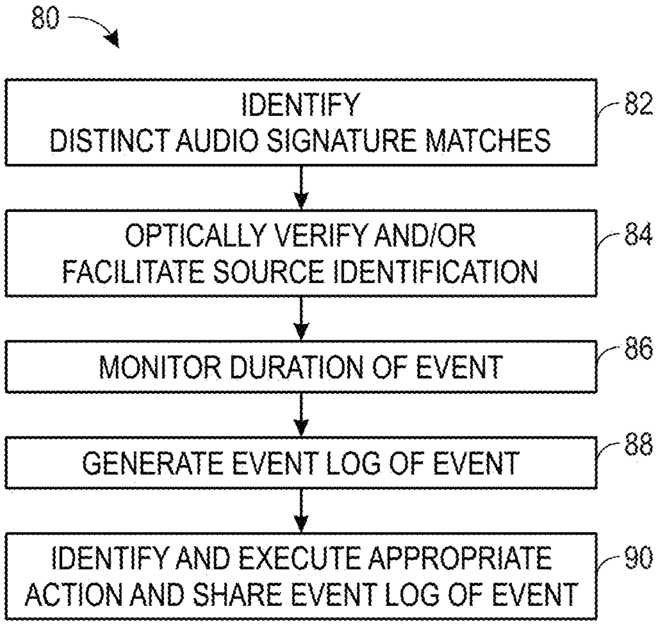
FIG. 4 is a flow chart of a method of CO monitoring system operation, in which the CO monitoring system responds to a detected event within a monitored space, in accordance with present embodiments.

FIG. 4 is a flow chart of a method 80 for assessing audio data to identify potential conditions, verifying said conditions, and executing a response, in accordance with embodiments described herein. Blocks 82 and 90 of the method 80 may correspond to blocks 66 and 70 of FIG. 3, respectively. Indeed, methods 60 and 80 may be performed in an overlapping manner, in series, or in parallel. While various system components may be involved in performing the method 80, for ease of reference, the method 80 is generally discussed as being implemented by the processor system 18, as will be understood by one of ordinary skill in the art.

At block 82 of the method 80, the processor system 18, through the use of audio recognition technology (e.g., an algorithm for comparing audio data characteristics) may identify one or more distinct audio signature matches between detected audio data (e.g., audio data being detected in a monitored area) and template audio data (e.g., stored audio data utilized for comparison and assignment to a likely source). The audio recognition technology may utilize machine learning or other types of artificial intelligence to further refine the precision and accuracy of the recognition of sounds as discussed above. The processor system 18 may also use image data (in conjunction with the audio data) in order to better understand what is occurring (e.g., generally within the environment) in order to generate a report of the situation, as represented by block 84. By employing audio and visual data, present embodiments may better assess a potential CO emission event. For example, sound data may suggest that a combustion engine is running and visual data may indicate that a lawnmower is vibrating, which may act as confirmation that the lawnmower is emitting CO. Thus, a better assessment of priority level for addressing the situation may also be determined.

Different priority levels may be assigned to different types of events. For example, a small combustion engine running in a garage with the garage door open may be a low level priority while a truck running in the garage with the garage door closed may be a high level priority. These priority levels may be based on the likely amount of CO being generated and its likely accumulation within a monitored area. Different priority levels may be used to determine what types of alerts or responses to take (e.g., automatically open the garage or merely send a text message alert to a designated contact). Priority level designations may be further refined from the use of AI. Each time a threshold priority level is identified and actions are taken, AI may be employed by the management system 12 to obtain and process feedback from the user indicating the priority level the user would assign to a situation. From this data, the use of ML or AI can be used to more accurately align with user designations of priority.

As previously noted, at block 84 the management system 12 may utilize the image sensor to optically verify an assessment of likely CO emission made based on audio data. For example, the processor system 18 may use image recognition technology to analyze what is happening in a monitored space. From image data (e.g., image data acquired from the image sensor 30), a vehicle, a person, a tool, or other items or systems of interest may be identified. The image data may include any of various different types of image data, such as infrared image data that can be used to verify the presence of a vehicle through the heat signature generated by the vehicle. When certain scenarios (e.g., changes) are detected in the image data, more certainty of assessments may be established. For example, if an infrared sensor detects a rapid change in temperature, this may confirm that a vehicle has recently been started. In another embodiment the system could also include a traditional CO detector, such as the CO detector 36, which could verify the presence of CO within the area. However, use of the traditional CO detector may be limited to when audio suggests that a CO emitting event at or above a certain priority is occurring, which may provide more longevity to the traditional CO monitor. In the event the room fills up with gas or is suspected of becoming filled with gas, the processor system 18 may allow the CO detector 36 to be exposed to atmosphere in the monitored space to determine and confirm the level of CO present. This confirmatory data from the CO detector 36 may then be used in improving the ML algorithm by verifying determinations.

At block 86, the processor system 18 may actively monitor the duration of an assessed event. This information may be added to a report of the event and may also contribute to achieving the threshold priority level in the event that the situation persists. For example, a low priority event (e.g., an assessment that a lawnmower is running) may increase to a high priority event if it persists beyond a threshold amount of time. Block 86 may represent continuously verifying that the audio sensor 20 is continuing to identify a particular sound. This may also include verifying that the image sensor 30 is continuing to indicate that the assessed audio source is still located within the monitored area. Further at block 88 the management system 12 may generate an event log of the situation which is occurring in order to share that log for evaluation (e.g., by a user) and/or further training using AI and ML features. This log may be filled with information regarding the source of the sound, the duration of the audio, the audio data itself, the identified priority level, the actions already taken, and actions which may be taken in the future.

At block 90 of the method 80, the processor system 18 may identify and execute an appropriate action or actions in response to the situation or level of priority previously identified. This may take into account the duration of the event determined in block 86 and/or historical data from the event log generated at block 88.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A carbon monoxide (CO) monitoring system for a garage, comprising:
- an audio sensor configured to be disposed in a garage structure that is configured to house at least one CO producing device, wherein the audio sensor is configured to detect sound and provide audio data based on the sound;
- a computing system configured to:
  - receive the audio data provided by the audio sensor,
  - filter low priority sounds out of the audio data to provide filtered audio data;
  - determine whether the filtered audio data is indicative of a CO emission event based on the filtered audio data and audio templates of an audio database; and
  - identify and execute one or more actions in response to determining the audio data is indicative of the CO emission event.

2. The system of claim 1, wherein the computing system is configured to:
- determine a priority level of the CO emission event in response to determining the filtered audio data is indicative of the CO emission event; and
- identify and execute one or more additional actions indicative of the priority level.

3. The system of claim 1, wherein the computing system is configured to identify a source of CO emission associated with the CO emission event.

4. The system of claim 3, wherein the computing system is configured to determine or assign a level of CO emission based on the source of CO emission and/or a duration of the CO emission event.

5. The system of claim 1, wherein the audio templates of the audio database comprise audio data corresponding to previously identified CO emission events.

6. The system of claim 1, wherein the computing system is configured to identify the at least one CO producing device as a cause of the CO emission based on correlating the filtered audio data to a motor vehicle, a power tool, lawn equipment, or of a combination thereof.

7. The system of claim 1, wherein the computing system is configured to activate a ventilation system of the garage structure in response to determining the filtered audio data is indicative of the CO emission event.

8. The system of claim 1, wherein the computing system is configured to:
- determine whether the filtered audio data is indicative of the CO emission event by inputting the filtered audio data into a machine learning model, wherein the machine learning model is trained on datasets comprising the audio templates of the audio database and respective events corresponding to the audio templates.

9. The system of claim 1, comprising a CO detection confirmation system, wherein the computing system is configured to:
- activate the CO detection confirmation system in response to determining the filtered audio data is indicative of the CO emission event, wherein the confirmation system is configured to analyze infrared image data that is different from the audio data to assess whether the determining of the filtered audio data as indicative of the CO emission event is accurate.

10. The system of claim 9, wherein the computing system is configured to update the audio database to include the audio data as an additional audio template upon confirming that the determining of the audio data as indicative of the CO emission event is accurate.

11. A non-transitory computer-readable medium comprising computer-executable instructions that, when executed by a processor, cause the processor to:
- receive audio data associated with a garage from an audio sensor;
- filter low priority sounds out of the audio data to provide filtered audio data;
- determine whether the filtered audio data is indicative of a CO emission event within the garage based on the filtered audio data and audio templates of an audio database; and
- execute one or more actions in response to determining the filtered audio data is indicative of the CO emission event.

12. The non-transitory computer-readable medium of claim 11, wherein the computer-executable instructions are configured to cause the processor to:
- in response to determining the filtered audio data is indicative of the CO emission event, determine a priority level of the CO emission event; and
- execute one or more additional actions corresponding to the priority level.

13. The non-transitory computer-readable medium of claim 12, wherein the computer-executable instructions are configured to cause the processor to determine an updated priority level at a later time based on a duration of the CO emission event.

14. The non-transitory computer-readable medium of claim 11, wherein the computer-executable instructions are configured to cause the processor to:

receive additional data from a confirmation system in response to determining the filtered audio data is indicative of the CO emission event, wherein the additional data is different from the audio data; and verify the determining the filtered audio data is indicative of the CO emission event based on the additional data.

15. The non-transitory computer-readable medium of claim 14, wherein the computer-executable instructions are configured to cause the processor to:

update the audio database to include the audio data as an additional audio template based on verifying the determining the audio data is indicative of the CO emission event based on the additional data.

16. A method, comprising:

receiving audio data associated with a garage from an audio sensor;

filtering low priority sounds out of the audio data to provide filtered audio data;

determining whether the filtered audio data is indicative of a CO emission event based on the filtered audio data and audio templates of an audio database; and executing one or more actions in response to determining the filtered audio data is indicative of the CO emission event, wherein the one or more actions comprise initiating a CO detection sensor.

17. The method of claim 16, wherein determining whether the filtered audio data is indicative of the CO emission event based on the filtered audio data and the audio templates comprises determining the filtered audio data is indicative of the CO emission event by identifying a correlation between the filtered audio data an emission audio template of the audio templates that indicates the CO emission event most likely occurred.

18. The method of claim 16, comprising:

receiving additional data associated with a device of a confirmation system in response to determining the filtered audio data is indicative of the CO emission event, wherein the additional data is different from the audio data;

verifying determining the filtered audio data is indicative of the CO emission event based on the additional data; and updating the audio database to include the filtered audio data as an additional audio template upon the verifying.

19. The method of claim 16, comprising activating a ventilation system to transition the garage to an increased ventilation area in response to determining the filtered audio data is indicative of the CO emission event.

20. The system of claim 1, wherein the computing system is configured to:

identify one or more time periods of increased likelihood of the CO emission event based on one or more factors; and initiate operation of one or more additional sensors configured to provide one or more additional types of data during the one or more time periods.

* * * * *